March 6, 1951     A. G. HOUPT ET AL     2,543,971
APPARATUS AND PROCESS FOR DISTILLATION OF HCN
Filed April 24, 1947
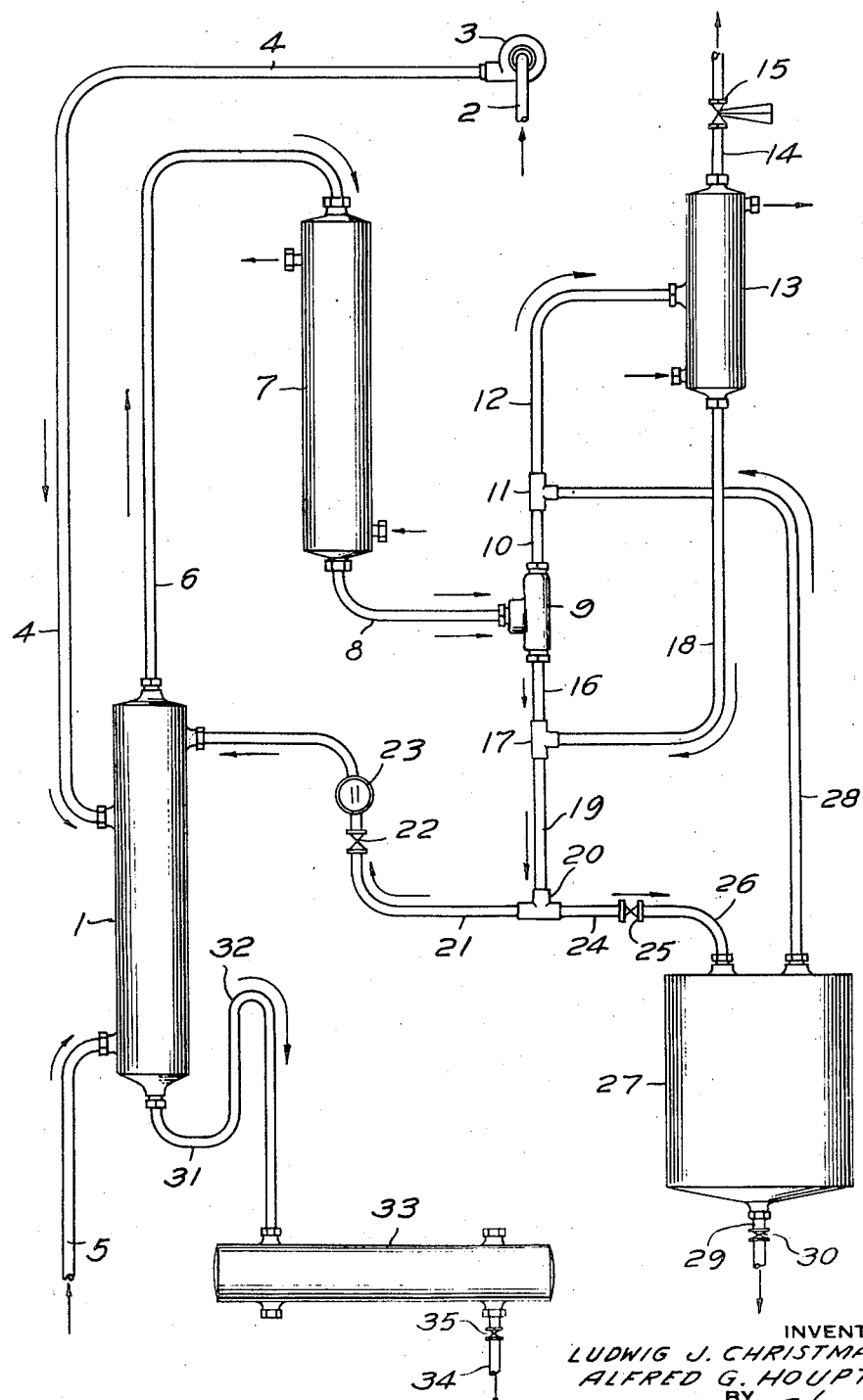
INVENTORS
LUDWIG J. CHRISTMANN
ALFRED G. HOUPT,
BY
Elmer W. Harmon
ATTORNEY Patented Mar. 6, 1951

2,543,971

UNITED STATES PATENT OFFICE 2,543,971

APPARATUS AND PROCESS FOR DISTILLATION OF HCN

Alfred G. Houpt, Stamford, Conn., and Ludwig J. Christmann, Yonkers, N. Y., assignors to American Cyanamid Company, New York, N. Y., a corporation of Maine Application April 24, 1947, Serial No. 743,594

3 Claims. (Cl. 202—69)

This invention relates to the production of hydrocyanic acid. More particularly, it relates to an improved process and apparatus whereby the hydrocyanic acid content of an aqueous solution may be recovered therefrom. Still more specifically, it relates to a process and apparatus whereby hydrocyanic acid may be stripped from solution using ordinary cooling water in the condenser.

Production of hydrocyanic acid for industrial use has been accomplished in many different ways. Because of the commercial importance of the product, various processes have been proposed using novel or more readily-available raw materials in attempts to lower production costs. For various reasons, none as yet have proved universally successful.

One such proposal was to react a gas mixture comprising ammonia, a gaseous or vaporized hydrocarbon, and the requisite amount of oxygen. The mixture, at or below atmospheric pressure, was to be subjected to combustion in the presence of a suitable catalyst, preferably a metallic platinum-iridium alloy, though other noble metals and alloys were suggested. The hydrocyanic acid content of the combustion products was then to be separated therefrom. Theoretically the operation of such a process appears to offer many commercial advantages. Readily-available starting materials are utilized and the reaction would appear to be capable of being readily conducted in simple apparatus.

In attempted practice, however, appearances prove to be deceptive. Many difficulties, generally unexpected, were encountered. One of the more serious was found to be the extreme difficulty in isolating the product as liquid HCN. Actually, several factors are involved in this one problem. The more important of these may be summarized as follows:

1. The presence of $NH_3$ in the HCN-containing gases,
2. The corrosive nature of wet HCN gas and aqueous HCN solutions, and
3. The low concentration of HCN in these gases.

For example, $NH_3$ causes decomposition of the HCN, forming azulmic acid, an insoluble, non-volatile, black solid. This fouls the system and, in addition, represents a direct loss of HCN. It is overcome by immediate removal of $NH_3$ by contacting the gas mixture with hot aqueous acid. This removal of $NH_3$ is not directly concerned in the particular process of the present invention but it is a feature which must be considered.

Even after complete removal of $NH_3$, the problems of operation are not wholly solved. Aqueous HCN solutions and gases containing HCN and water, especially near their dew point, attack steel, copper and their common alloys. Even more troublesome than the direct corrosion of the metal is the progressive destruction of HCN catalytically by the ammonia formed during the corrosion. The ammonia causes condensation of the HCN to azulmic acid, this condensation liberates more ammonia, and the whole results in continuously accelerating autocatalytic destruction of the HCN.

Last, but not the least important, is the problem of the composition of the combustion products, they consist mainly of fixed gases and even after selective absorption therefrom of unchanged ammonia, HCN constitutes only a minor proportion of the remaining gases. Yet it is this minor fraction which must be isolated as the product. Two general approaches to the problem, i. e., condensation or absorption, might be considered. Neither are wholly satisfactory.

Direct condensation, for example, presents several difficulties. At its melting point, —13° C., HCN has a vapor pressure of 138 millimeters of mercury. Since this is of the same order as the partial pressure of HCN in the product gas mixture, little, if any, HCN can be separated without going to even lower temperatures. Direct condensation of the HCN is impractical, therefore, both because of the necessity of cooling large proportions of fixed gases to the extremely low temperature required and the disadvantage of handling a solid condensate.

Absorption of the HCN by reaction with alkaline materials such as caustic soda solution is entirely operable. However, it has the disadvantage of consuming an equivalent quantity of the alkali and, if HCN is to be reliberated, of some acid, such as $H_2SO_4$ or the like. Further, since the HCN-containing gases also contain a small proportion of $CO_2$, the latter will also be absorbed by the alkali, consuming further quantities of it.

Solid adsorbents, such as silica gel, absorb HCN fairly efficiently from large proportions of fixed gases. However, these adsorbents have a marked drawback in that they have very poor heat transfer properties. This is troublesome because very considerable heat of adsorption must be removed to continue the adsorption. Furthermore, this heat must be subsequently returned in order to desorb and recover the HCN from the adsorbent.

Non-reactive liquid absorbents for HCN, other than water, might be employed. However, the partial pressures of HCN over its solutions in those solvents, including water, with which liquid HCN is miscible but does not react, are essentially of the same order of magnitude. Solutions obtained by absorbing HCN from the fixed gases with such solvents contain only about 1 to 4% HCN by weight. Relatively large proportions of solvent, therefore, must be employed. As a certain fraction of the absorbing liquor will be lost in various ways, such as by volatilization or by entrainment in the rejected fixed gases, the use of water is quite advantageous compared with other relatively costly solvents.

As the boiling point of HCN is only 25.7° C. it is very easily stripped from the aqueous solution resulting from the absorbing operation. Unfortunately, however, this low boiling point is in turn disadvantageous for the recondensation of the vapors to liquid HCN. As liquid HCN has a vapor pressure of 263 millimeters of mercury even at 0° C. practicable condensation and recovery cannot ordinarily be achieved with water as the coolant. Also, as noted above, HCN has a vapor pressure of 138 millimeters of mercury even at its freezing point, −13° C., and as a solid condensate would be operationally impractical, a refrigerated coolant such as cold brine cannot provide a complete solution to the problem. Furthermore, materials adequately resistant to corrosion by brine for the construction of condensing equipment are generally both attacked by and deleterious to the HCN. Thus, iron and many stainless steels which resist brine corrosion are attacked by HCN.

In the past, a solution to the HCN isolation problem which was not subject to trouble as to one or the other of these respects was not available. Nevertheless, a solution to the problem would go far toward increasing the commercial operability of an otherwise apparently desirable procedure. It is, therefore, the principal object of the present invention to devise a process of and an apparatus for the ready separation and recovery of HCN from even dilute aqueous solution. The process preferably must utilize water as the coolant. It should be capable of being carried out without excessive loss of product HCN. It is also an object of the invention to provide an apparatus capable of carrying out this procedure without being subject to attack by or causing decomposition of the product.

In general, these objects have been accomplished by the provision of a stripping column provided with (a) a suitable pressure feed source; (b) a suitable condenser; (c) means for separating condensate and inert gases; (d) means for providing the correct amount of reflux; (e) means for collecting product condensate; and (f) means for releasing pressure thereon.

In general, the apparatus combination has two distinguishing features. It is constructed substantially entirely of aluminum. Secondly, it is pressure tight, the process being characterized in that the entire operation is carried out under super-atmospheric pressure, the pressure being released only from the product and from vented gases.

The process and apparatus of the present invention may be more easily described with reference to the accompanying drawing. The latter comprises a diagrammatic flowscheme, showing in simplified form the essential elements of the apparatus and the flow of materials between them.

As shown in the drawing, the apparatus embodies a stripping column of some conventional type, generically designated 1. Liquor to be stripped is drawn from suitable source through conduit 2 by a suitable pump 3 and thereby introduced into the column at an upper level therein through a suitable feed conduit 4. Steam for stripping is introduced near the bottom from any suitable source through a suitable conduit 5. Overhead vapors, comprising HCN and some uncondensed insoluble gases, leave the top of stripper 1 through a suitable conduit 6, whereby they are introduced into a condenser 7 of conventional design. Because of the nature of the product, the condenser must be of an indirect heat-exchanger type in which coolant and gas cannot come into contact.

Condensate leaves condenser 7 through conduit 8 and is passed to a liquid-gas separator 9. In the latter, permanent, uncondensed gases separate from the condensate and are taken from the separator through conduit 10, passing through T 11 and conduit 12 into a suitable vent condenser 13. Gases leave the latter at the top through a suitable conduit 14 and are vented to the stack by means of a suitable pressure controlled valve 15. Condensate leaves the liquid-gas separator 9 through conduit 16, passing through T 17, in which it is admixed with any condensate obtained in the vent condenser 13, condensate being removed from the latter through a conduit 18 connecting the bottom of vent condenser 13 and T 17.

The combined condensates pass from T 17 through conduit 19 into T 20 in which the flow is divided. A part is taken through conduit 21, in amounts regulated by valve 22 and indicated by flow meter 23, back to stripper 1 as reflux, being returned to the latter at an upper level, above the incoming feed from conduit 4. The remaining condensate passes through conduit 24, valve 25 and conduit 26 into a suitable receiver or storage tank 27.

Vapors encountered in the space above the liquid in tank 27 are vented from the tank by means of a conduit 28 connecting tank 27 to T 11, in which they are combined with the vapors leaving the liquid-gas separator 9 and together therewith pass through conduit 12 to the vent condenser 13. Liquid HCN product is drawn from tank 27 through conduit 29. The pressure on the product is relieved by releasing the product through valve 30 in conduit 29 to suitable blow tanks and to use or storage. The blow tanks, being conventional, are not shown.

Bottoms from stripper 1 are removed at a low level therein through a suitable conduit 31. In order to maintain a body of fluid in the lower part of stripper 1, conduit 31 is provided with some overflow control. This control may take any desired form and is merely indicated by the inverted U 32, the top of which is set at the fluid level it is desired to maintain in the column. These still bottoms are passed through a conventional heat-exchange cooler 33, being taken therefrom through conduit 34. To prevent pressure in column 1 from blowing all the bottoms therefrom, a restriction must be provided. As shown in the drawing this is done by providing a valve 35 in conduit 34. It may be located elsewhere as in conduit 31, for example. It may be replaced by any suitable equivalent device.

The disposition of the still bottoms may take any desired form. Actually they are preferably reused as the absorbent fluid for taking up HCN in another part of the apparatus. How this absorption is carried out is not a critical feature of the present invention. It is shown in detail in our copending application, Serial No. 743,592, filed of even date.

As was noted above, the essential elements of the apparatus are constructed of aluminum. This is done because of the surprising resistance to attack by HCN possessed by this metal. This corrosion resistance is even more surprising in view of the attack by HCN on many materials usually considered inert to active corrosion, as for example many of the stainless steels.

In the process of the present invention, attention must also be given to the choice of an operating pressure. As noted above, this must be a positive pressure, above atmospheric, and above that required simply to overcome flow resistance in the apparatus. A number of factors govern the selection of the pressure range to be used. For example, while pressures above about 40 to 50 pounds beyond atmospheric might be used, they are not considered practicable. To exceed this pressure range will require a special apparatus design and the use of steel or other reinforcement of the aluminum equipment.

As a practical consideration, even 40 to 50 pounds above atmospheric exceeds the optimum upper limit. Pressures above about 25 to 30 pounds beyond atmospheric have no particular advantage. The required steam pressure and consumption both increase with increasing operating pressures. Further, retention of HCN in the bottoms liquors tends to increase with increasing pressure. There is also increased cost in increasing the power required to force in the feed liquor as the pressure on the stripping column is increased. Since all these represent increased costs, there is a definite advantage in not using pressures higher than necessary.

While 25 to 30 pounds above atmospheric represents about the maximum useful pressure, in actual practice the operating pressure usually will be even lower. Preferably a pressure of about 12 to 15 pounds above atmospheric is utilized. At about 15 pounds pure HCN condenses at about 45° C. (113° F.) and at 12 pounds it condenses at about 42° C. (107° F.). By comparison, at normal atmospheric pressure pure HCN condenses at about 25.7° C. or 78° F. It is in these relationships that the essential advantage of the present invention lies. Ordinary ground water at about 70°–90° F. may be used as the coolant for efficient recovery of HCN when its condensation point is brought within the range of about 105°–115° F. by operating under pressure. At atmospheric pressure, the low condensation temperature precludes the use of such coolant.

Further, the combination of pressure stripping and the use of a water coolant makes the aluminum equipment wholly practicable. As noted above, this is highly desirable because of the resistance of aluminum to corrosive attack by HCN. If condensation were carried out at atmospheric pressure (780 F.), a refrigerated coolant such as brine would be necessary. This would preclude the use of aluminum condensers which are rapidly attacked by brine.

From the foregoing considerations it can be seen that the preferred operating pressure range will be a pressure exceeding that required to overcome flow resistance in the apparatus, usually only a few pounds per square inch, and will be under about 25–30 pounds per square inch. This, in preferred operation, will be found further limited to a minimum of about the 10 to 12 pounds pressure required to obtain efficient condensation with ground water coolant and a maximum of about 15 to 18 pounds per square inch.

The fluid to be evaporated, i. e., the feed, may be by gravity if the head is available. Usually it will be pumped through conduit 2 into the stripper by some suitable pressure pump available for the purpose. The latter operation is preferable in order that the pressure may be regulated if necessary to compensate for changes in temperature of the cooling water. This is an especial advantage during warm weather and in those areas in which the cooling water must be recovered and reused.

We claim:

1. The combination which comprises a steam stripping means; means for introducing aqueous HCN liquor into said stripping means; a condenser; a first conduit means, connecting and adapted to conduct overhead vapors from said stripping means to said condenser; a liquid gas separator means; a second conduit means, connecting and adapted to conduct condensate from said condenser to said separator means; a second condenser; a third conduit means, connecting and adapted to pass vapors from said separator means to said second condenser; pressure-controlled venting means adapted to release gases from said second condenser; a fourth conduit means, connected and adapted to remove liquid from said separator means; a fifth conduit means, connected and adapted to remove condensate from said second condenser; joining means adapted to connect said fourth and fifth conduit means; a sixth conduit means extending said joining means to an upper level in said steam stripping means; a tank means; a seventh conduit means extending from said joining means to said tank means; means for venting said tank means, said tank venting means being pressure controlled; means for controlling the proportional flow in said sixth and seventh conduit means and means for releasing pressure from the fluid in said tank means; said combination being further characterized in that all parts in contact with HCN vapors and solution are constructed of aluminum metal.

2. In a process of recovering liquid HCN from dilute aqueous liquors thereof by stripping the HCN from said liquors and condensing the HCN, the improvement which comprises, steam stripping under increased pressure; subjecting the resultant vapors to condensation under pressure using ground water as coolant, separating the condensate from any non-condensed vapors; again subjecting the non-condensed vapors to condensation under pressure; separating the resultant condensate from any residual gases; combining the condensates; returning part of the combined condensate as reflux to said steam stripping operation, collecting the remainder of said combined condensate as product, and releasing the pressure on said condensate product; said operations being carried out in aluminum metal apparatus, the pressures ranging from 10–30 pounds per square inch above atmospheric.

3. A process according to claim 2 in which the pressure is 10–12 pounds per square inch above atmospheric.

ALFRED G. HOUPT.
LUDWIG J. CHRISTMANN.

REFERENCES CITED

The following references are of record in the file of this patent:

UNITED STATES PATENTS

| Number | Name | Date |
|--------|------|------|
| 1,527,144 | Lichtenthaeler | Feb. 17, 1925 |
| 1,835,063 | Langmeier | Dec. 8, 1931 |
| 2,012,621 | Bennett | Aug. 27, 1935 |
| 2,140,605 | Sperr | Dec. 20, 1938 |
| 2,419,225 | Mitchell | Apr. 22, 1947 |

Certificate of Correction

Patent No. 2,543,971

March 6, 1951

ALFRED G. HOUPT ET AL.

It is hereby certified that error appears in the printed specification of the above numbered patent requiring correction as follows:

Column 5, line 55, for "(780 F.)" read *(78° F.)*;

and that the said Letters Patent should be read as corrected above, so that the same may conform to the record of the case in the Patent Office.

Signed and sealed this 15th day of May, A. D. 1951.

[SEAL]

THOMAS F. MURPHY,
*Assistant Commissioner of Patents.*